United States Patent

Hunter

[15] 3,656,275

[45] Apr. 18, 1972

[54] PROCESS FOR THE REMOVAL AND CONCENTRATION OF A COMPONENT GAS FROM A MULTI-GASEOUS STREAM

[72] Inventor: Wesley L. Hunter, Houston, Tex.

[73] Assignee: Ashland Oil, Inc., Houston, Tex.

[22] Filed: Jan. 20, 1968

[21] Appl. No.: 738,701

[52] U.S. Cl. ........................................ 55/31, 55/73, 55/94, 23/225
[51] Int. Cl. ........................................................ B01d 53/14
[58] Field of Search ........................ 55/31, 46, 51, 68, 73, 93, 55/94; 23/2, 150, 181, 225

[56] References Cited

UNITED STATES PATENTS

| | | | |
|---|---|---|---|
| 2,596,692 | 5/1952 | Jordan........................................ | 55/73 |
| 2,994,588 | 8/1961 | Eickmeyer.............................. | 23/225 |
| 3,120,993 | 2/1964 | Thormann et al. .......................... | 23/2 |
| 3,260,035 | 7/1966 | Wheelock et al. .......................... | 55/73 |

Primary Examiner—Reuben Friedman
Assistant Examiner—Charles N. Hart
Attorney—Walter H. Schneider

[57] ABSTRACT

A process and related system for the removal and concentration of a component gas from a stream containing a plurality of gaseous components. The process is directed to the removal and subsequent concentration of a gas stream component in which the component exists as a particularly small percentage (as low as 1 percent or less) of the total stream volume. It is especially appropriate for the removal and concentration of organic and inorganic sulphur gases, such as hydrogen sulphide or sulphur dioxide from effluent acid gas streams. The system is of the regenerative liquid solvent type using an absorber tower and subsequent solvent fractionator. The solvent is injected into the absorber tower where contact is made with the acid gas stream having a component gas, such as the hydrogen sulphide, in relatively small quantity. The component gas is absorbed under closely controlled pressure and temperature conditions. In the case of hydrogen sulphide, the solvent used is preferably N-methyl-2-pyrrolidone which, when saturated is passed to the fractionator column where the hydrogen sulphide is released due to a controlled increase in temperature and reduction in pressure. The hydrogen sulphide is then passed to a separator where free water in the acid stream is accumulated and after which the concentrated hydrogen sulphide is passed to a boiler. There, a portion of the hydrogen sulphide is burnt to sulphur dioxide under controlled conditions. The sulphur dioxide and remaining hydrogen sulphide are then combined in presence of a catalyst and chemically reacted to produce water and commercially high grade elemental sulphur.

8 Claims, 1 Drawing Figure

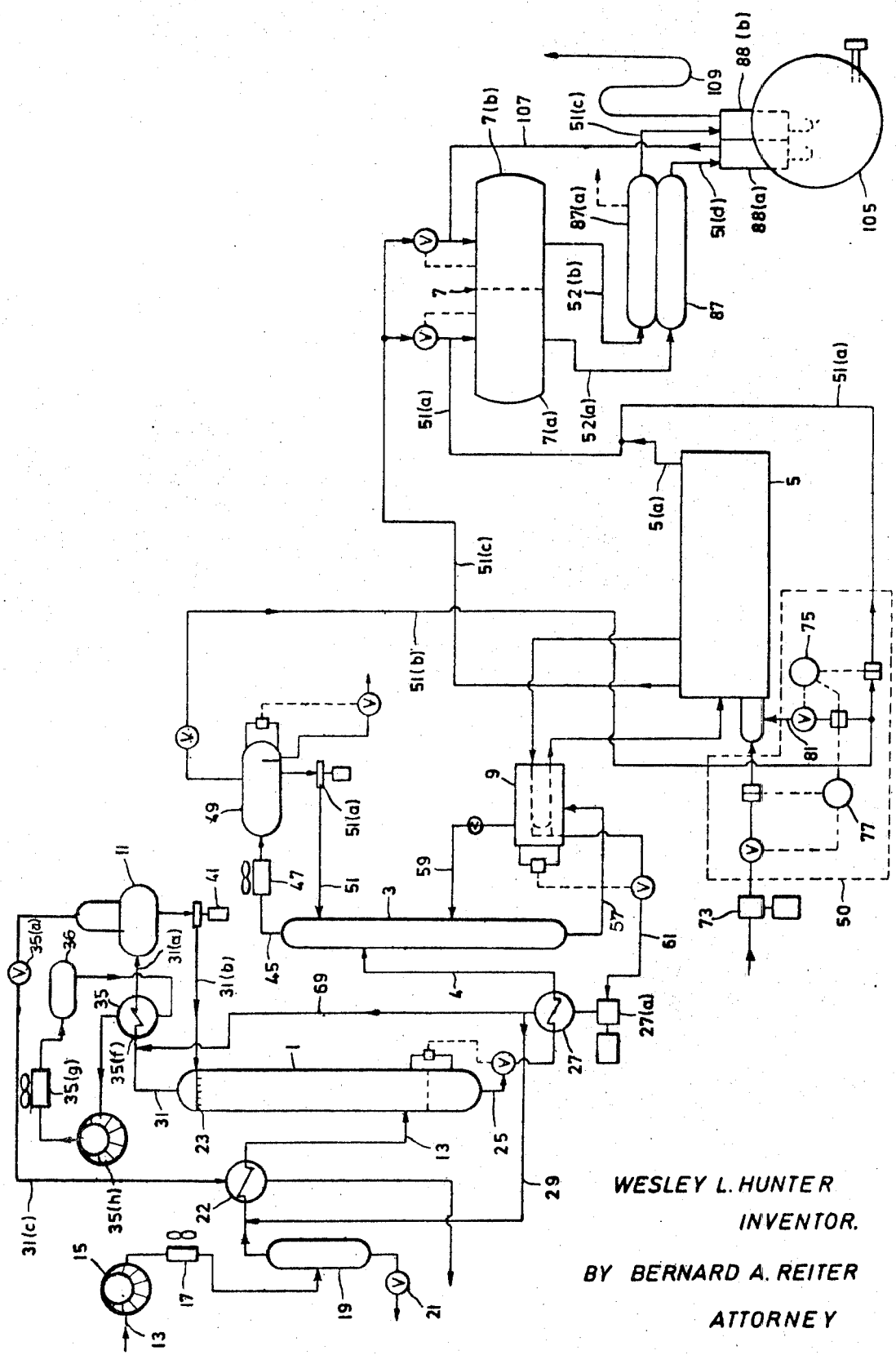

3,656,275

PROCESS FOR THE REMOVAL AND CONCENTRATION OF A COMPONENT GAS FROM A MULTI-GASEOUS STREAM

BACKGROUND OF THE INVENTION

In conventional practice, elemental sulphur is recovered from sour gas by first removing the acid gases, hydrogen sulphide and carbon dioxide, from a gas stream in which the acid gas content is about 35 percent or more of the total volume. If the gas stream contains less than about 35 percent, combustion becomes difficult to obtain. Assuming, however, that sufficient hydrogen sulphide exists to support combustion, the conversion thereof to elemental sulphur is accomplished in accordance with more or less conventional methods such as the well known claus type plant in which a fraction of the hydrogen sulphide is burned with air to form a sulphur dioxide stream which is generated as a by-product of the burning. The resulting sulphur dioxide is reacted with the remaining hydrogen sulphide over a catalyst to produce elemental sulphur vapor and water vapor. The sulphur vapor is subsequently recovered by condensation either in a tubular condenser followed by a separator or in a sulphur scrubbing tower providing direct contact with a recirculated stream of liquid sulphur at required temperatures. The sulphur-producing reaction is of high exothermic nature and typically produces a substantial temperature rise across the catalyst bed. Since the reaction is incomplete, especially at high temperatures, two or more stages of conversion are commonly used, with recovery of sulphur occurring after each reaction in order to maximize the yield. Exhaust gases are normally vented to atmosphere and the process is performed at substantially atmospheric pressure with pressure enough for the frictional losses through the equipment.

It is known that oxidation processes have also been developed for gas streams having hydrogen sulphide components of less than 35 percent. However, since the acid stream will not support combustion it is necessary to use a source of fuel to raise the temperature of the total gas stream to a level at which the hydrogen sulphide is converted to sulphur dioxide. The total stream is then passed to reactors where sulphur and water vapor are formed. All the inert gases are vented. Because of the large volume of inert gases handled by this process, the efficiency of the reaction is low. Difficulty is also encountered in recovering the sulphur vapors formed. Also, equipment must be sized to handle total volumes of gases, resulting in high initial cost and poor economics unless large volumes on the order of more than 20 tons of sulphur are recovered daily.

It may thus be recognized that, due to the complexity of these operations and the correllatively high costs involved, the recovery of sulphur from sour gas has heretofore been economically unattractive where the sour gas stream contains a relatively low percentage component of hydrogen sulphide. Also, the resultant gas flared to the atmosphere contains a sufficient volume of hydrogen sulphide and sulphur dioxide to cause serious atmospheric contamination. Due to the small volumes of hydrogen sulphide in these flared gases, however, it has heretofore been impracticable to attempt recovery of the sulphur in the hydrogen sulphide component of these gases. Whether such gases are vented in dilute concentrations of 0.05 to 0.3 volume-percent, such as the sulphur dioxide in flue gases of power plants, or in higher concentrations of about 5 to 10 percent as in roaster gases of smelter plants, their atmosphere contaminating effects are unquestionably a public health problem. Thus it is readily recognized that whether the vented gas is sulphur dioxide, hydrogen sulphide or others of toxic nature, it is highly desirable if not necessary to discover new and improved processes and means for removing them from streams vented to atmosphere, or at least minimizing the noxious and toxic properties in the vented gases.

THE INVENTION

In light of the discussion hereinabove, the present invention has, as a primary feature thereof, a process for the recovery of elemental sulphur from the hydrogen sulphide contained in the acid gas effluent in an amine treating plant. Another feature of the invention resides in the process for recovering elemental sulphur from the acid gas effluent of an amine treating plant where the effluent comprises a very low percentage component of hydrogen sulphide and relatively high percentages of carbon dioxide, nitrogen and hydrocarbons. Still another feature of the invention is a process which makes economically feasible sulphur recovery from acid gas effluents wherein the effluent contains a low percentage (as little as 1 percent) component of hydrogen sulphide. A further feature and advantage of the subject invention resides in a sulphur recovery process for concentrating the hydrogen sulphide in low content streams so as to make economically feasible the recovery of sulphur in quantities as low as three tons production per day. A further primary feature of the invention is the characteristic thereof to effectively reduce in substantial amounts the toxic components of industrial gases being vented to atmosphere. The application of this process not only enables the reduction of air pollution by gases such as hydrogen sulphide but in addition provides a means for recovering a by-product such as sulphur as previously explained. It will be readily recognized that although the description hereinafter is framed with reference to the recovery of sulphur in stable form from an acid gas stream having a low concentration of hydrogen sulphide that the process and teachings related thereto may readily be applied to other vent streams. For example, the invention could be used with any various hydrogen sulphide gases or it could reasonably be applied to in-plant gas streams where it is desired to remove and concentrate a specific gas and place it in some stable form. For example, it could be used for the removal of $CO_2$ to produce caustic soda.

In effectuating these and other advantages and features the present invention integrates the concentration and recovery operations so that all heating requirements of the concentration section are provided by a high pressure steam boiler in the recovery section. The high pressure boiler generates, as a by-product, heat which is carried back to a reboiler in the concentration section. Similarly a natural gas engine which drives the refrigeration compressor, air coolers and related equipment in the concentration section also drives the steam condenser and cooler fans serving the recovery section. The system is completely closed, with only make up water being required to replace leakage in the steam section. No boiler water treating equipment is required, nor is process water required since all process cooling is provided by aerial coolers of process steam.

The complete process herein is designed for unattended automatic operation and in event of difficulty in either the concentration or sulphur recovery sections, the entire system will automatically cease operation and so remain until operating personnel correct the condition and restart operation.

These and numerous other features and advantages of the invention will become more readily apparent upon reference to the following detailed description, claims and drawings wherein:

The drawing schematically illustrates a typical installation of apparatus for carrying out the invention.

With reference to the drawing, the installation of apparatus for carrying out the present invention comprises essentially an absorbtion tower 1 and a fractionator 3, both of which may consist of conventional tower packing or trays known per se, a boiler system 5, and compartment reactor 7. The absorption tower 1, fractionator 3, and associated reboiler 9, separators 11, 49 and conduits constitute the primary components of the hydrogen sulphide concentration section while the boilers 5, reactor 7, and associated conduits and equipment comprise the sulphur recovery section. The two sections will therefore be referred to hereafter as the Concentration Section and the Recovery Section of the process.

CONCENTRATION SECTION

In accordance with the present invention the impure gas effluent is scrubbed with an organic water soluble absorbent such as the N-alkylated pyrrolidones or piperidones which may be substituted with one or two lower alkyl group e.g. methyl groups, of the heterocyclic family. The absorbents are water soluble and may consist of:

N-methylpyrrolidone
N-methyl-2-methylpyrrolidone
N-methyl piperidone

The preferred absorbent of the invention is N-methyl-2-methylpyrrolidone in that it effects a selective absorption of the hydrogen sulphide from the acid gas. For exemplary purposes it may be assumed that the feed gas into the absorber has a composition of approximately $H_2S = 19.88$ Moc%, $CO_2 = 74.12$ Moc%, $N = 0.09$ Moc% with the remainder being hydro-carbons. It is found in accordance with the invention that a solvent mixture of from 75 percent to 95 percent N-methyl-2-pyrrolidone (M-Pyrol, such as manufactured by General Aniline and Film Corporation) and up to 25 percent water is optimally suited for preferential absorption of the hydrogen sulphide from the raw feed gas. This M-Pyrol water mixture improves the selectivity of the pyrrolidones and piperidones also for sulpher compounds.

Relative proportions of M-Pyrol and water are dependent in large degree on the temperature at which fractionator 3 is operated from the reboiler 9. For example if too much water is present excess steam is created and flooding of the fractionator occurs. Too little water results in not enough reflux ($H_2O$) going into the tower to wash the solvent back, thus directly affecting the loss of methyl pyrrolidones.

The gas which is to be purified is introduced into the system through conduit 13 and into the compressor 15 wherein the pressure is brought from slightly above atmospheric to about 45 (45) p.s.i.g., or optimum pressure. Upon exiting the compressor the gas is carried under pressure through air cooler 17 where it is brought to near ambient temperature. The stream passes to liquid separator 19 where free water and hydrocarbons in liquid form are removed through drain 21. The ambient temperature enriched stream is passed from the separator 19 to a gas to gas exchanger 22 where temperature is reduced to within about 20° F. of the minimum process temperature. This temperature may range from about 20° F. to 60° F. to obtain optimal operation. The cool rich gas then introduced into the absorber tower 1 at the lower section thereof whereupon it is contacted by cold-presaturated solvent which has been chilled to 40° F. or less. The solvent (M-Pyrol) is injected into the upper section of the absorber 1 by a distributor or spray nozzle 23 communicating with conduit 31(b) which leads from the reflex pump 41. The absorbent flows downwardly through the tray or packed sections of the absorber tower 1 and comes into contact with the gas flowing upwardly therethrough and in countercurrent relation therewith. The absorbent charged with impurities during this countercurrent contact with the gas is discharged from the bottom of absorption tower 1 through a conduit 25 and is passed through a liquid to liquid heat exchanger 27 with lean methyl-pyrrolidone. The temperature of the stream is increased in the exchanger(s) 27 to about 240° F. before entering the fractionator via conduit 4. It will be recognized as explained above that the absorption characteristics and solubility of the M-Pyrol are controlled by lowering or raising of the temperature of the chiller 35 of the acid gas and increasing or decreasing the pressure at the back pressure valve 35(a).

The residue gases from the acid gas stream depart the absorber tower 1 from the top via conduit 31. The residue consists of carbon dioxide, nitrogen and hydro-carbon with trace quantities of hydrogen sulphide also. In order to recover the trace of hydrogen sulphide in this stream, methylpyrrolidone solvent is injected into the residue gas at the chiller inlet 35(f). The combined solvent-residue gas stream is then passed to chiller (propane) 35 where the temperature of the stream is reduced to the optimum operating conditions. The chiller is conventional propane refrigeration in which propane vapors are withdrawn from the controlled vapor section of the chiller by a compressor 35(h). This compressor increases the pressure of the propane vapors to a point at which they will condense to liquid in air condenser 35(g) and then returned to propane storage tank 36 for return to the chiller so as to maintain a controlled chiller liquid level. The residue stream then is passed by conduit 31(a) to cold separator 11. The separator 11 is of conventional design consisting of a separator stack with mist eliminator. Here the methyl-pyrrolidone liquid separates from the residue gas and is removed by pump (reflux) 41. The liquid is then fed back to absorber tower 1 via conduit 31(b) where it is sprayed on to the acid gas being fed in through the entry conduit 13. It is thus readily seen that the liquid solvent circuit is of closed loop design so as to enable continuous recirculation. Simultaneously the gaseous residue stream exiting from separator 11 is passed by conduit 31(c) back to the gas to gas exchanger 22 where it exchanges its cold temperature with the acid gas stream for reprocessing in absorber 1.

As explained previously the saturated methyl pyrrolidone accumulates in the lower end of absorber 1 and is passed via conduit 25 through the liquid to liquid exchanger 27 with the lean M-Pyrol. Here the solvent is heated before being fed to fractionator 3. The liquid stream is fed to the mid-section of the fractionator 3 where, due to the controlled elevated temperature and reduced pressure, hydrogen sulphide is released. The vapors from the fractionator are removed via conduit 45, through air cooler 47 where water and hydrocarbons contained in the vapors are liquified and separated in separator 49. It should be noted that the concentration of $H_2S$ in conduit 45 is dependent on and influenced by the ratio of the rates of flow of the solvent and gas stream and operating conditions in the absorber primarily. A condensate of free water is returned by pump 51(a) to fractionator 3 through conduit 51 so as to control M-Pyrol suspended in the hydrogen gas stream of upper section of fractionator 3. Water may also be added here, and then pumped to the fractionator 3 through conduit 51 so as to control M-Pyrol suspended in the hydrogen sulphide gas stream. The concentrated hydrogen sulphide in the separator 49 passes through conduit 51(b) to the gas control system.

Settling to the bottom of the fractionator is a hydrogen sulphide-methyl pyrrolidone liquid mixture. This mixture is withdrawn through conduit 57 and fed into reboiler 9 where the mixture temperature is increased to optimum operation and hydrogen sulphide gas is released through conduit 59 and fed back to the fractionator to join the hydrogen sulphide being released through conduit 45 for transmission to the cooler and separator 49. Simultaneously, a lean mixture of methyl pyrrolidone is drained from the reboiler 9 through conduit 61. The temperature of vapor in reboiler 9 for the fractionator is in the range of 300° F. and is provided by approximately 150 p.s.i.g. steam generated in the primary reactor of the Recovery Section. The steam is transmitted to reboiler 9 via appropriate piping as shown.

The hot lean solvent from reboiler 9 is conveyed via conduit 61 by pump 27(a) and heat is released in exchanger 27 to the richer solvent in conduit 25. The lean solvent is conveyed by conduit 69 to the residual gas inlet of chiller 35 of the absorber overhead gas stream. The combined gas/liquid is chilled to the optimal temperature of 40° F. or lower in the chiller. The cold residue gas is separated from the saturated lean solvent in separator 11 as previously explained. Saturated lean solvent is pumped then from separator 11 into the top of the absorber through conduit 31(b) by means of pump 41.

RECOVERY SECTION

As described above the concentrated hydrogen sulphide stream passes from the separator 49 to the gas control system 50 where the desired percentage of the total stream is diverted to the boiler 5. This split stream directed to the boiler is combined with air and burned to form a mixture of sulphur dioxide and hydrogen sulphide. It is conveyed through conduit 5(a) where it is combined with the remaining portion of H₂S in conduit 51(a). Conduit 51(a) carries the combined stream to reactor 7(a) where, in the presence of a catalyst, elemental sulphur and water vapor is formed.

The process may in general be represented by the following equation:

$$2 H_2S + SO_2 \rightarrow 3 S_e + 2 H_2O + (53.5 \text{ BTU/SCF of } H_2S)$$

The blower 73 supplies sufficient air to burn the desired percentage of the total hydrogen sulphide gas and all hydrocarbons present in the feed. The stoichiometrically correct air proportion may be regulated by flow ratio controllers 77 of the gas control system. The remaining portion of the hydrogen sulphide stream is by-passed around the boiler by means of the flow ratio controller 75. The desired portion of the stream enters the boiler 5 via conduit 81 while the remaining portion of the stream is carried by conduit 51(a) to the catalytic chambers or reactors 7. All of the gasses pass through the first catalytic chamber 7(a) where the reaction indicated by the aforementioned equation above takes place in the presence of a bauxite catalyst. These gasses are conveyed via conduit 52(a) to condenser 87 where temperatures are cooled to approximately 350° F. causing sulphur to condense. The condensed sulphur and resulting gases are conveyed to separator 88(a) via conduit 51(d) where molten liquid sulphur is separated and drained to storage tank 105. Unreacted gases and water vapor pass out of the first stage separator 88(a) and into the second stage catalyst chamber 7(b) through conduit 107. In order to maintain the desired temperatures on second stage catalyst chamber 7(b), hot gases from boiler 5 are combined from conduit 51(c), thus permitting the bases entering the catalyst beds of reactor 7(b) to be above the sulphur dewpoint of approximately 400° F. The gases pass through the second catalyst and chamber 7(b) where the aforementioned reaction occurs in the presence of a catalyst. Gases from the reaction pass to a condenser 87(a) via conduit 52(b) where the temperature is reduced sufficiently to condense sulphur. The molten sulphur is separated in condenser-separator 88(b) and is drained to storage tank 105. Water vapor and gases pass from condenser-separator 88(b) to vent stack 109.

In operation the operator must adjust the set points of flow ratio controllers 77 and 75 in the gas control system 50 so as to maintain the ratio of hydrogen sulphide to sulphur dioxide at the optimum ratio of H₂S to SO₂. The controller setting required to maintain such ratio will vary depending on the analysis of the hydrogen sulphide rich feed gas.

In accordance with the above, it will be readily recognized by those versed in the art that numerous and varied substitutions may be made to the invention and that therefore the description above is to be varied as demonstrative thereof, and therefore the invention shall be interpreted within the spirit and scope of the claims appended hereto; that which is claimed and desired to be secured by Letters Patent of the United States is:

I claim:

1. In a process for the removal and concentration of a low volume component gas in a multi-component gaseous stream in which the stream is initially scrubbed in an absorption vessel with a liquid absorbent whereby a portion of said stream is absorbed and another portion of said stream is not absorbed in said liquid absorbent in said absorption vessel, said liquid absorbent containing low volume component gas being conducted from an outlet in the absorption vessel to a desorption zone in which the low volume component gas is liberated from the liquid absorbent to thereby regenerate the absorbent, said regenerated absorbent being recycled to the absorption wheel, the improvement wherein the portion of the stream not absorbed in the absorption vessel by said absorbent contains trace quantities of said low volume component gas along with absorbent in the gaseous state, all of which constitute a residue gas stream, conducting said residue gas stream through a residue absorption zone operated at conditions for removing said trace quantities and through a separator zone for separating absorbent from said residue stream, and recycling the recovered absorbent having trace quantities of said low component gas therein to said absorption vessel.

2. The process according to claim 1 wherein prior to the recycling of said regenerated absorbent to the absorption vessel, said regenerated absorbent is conducted to said residue gas stream upstream of said residue absorption zone for providing a closed conduit liquid absorbent circuit for maximizing concentration of said low volume component gas at the outlet of said absorption vessel.

3. The process according to claim 2 wherein, prior to recycling the liquid absorbent to the absorption vessel, it is withdrawn from the desorption zone and recycled back thereinto so as to enhance removal and final concentration of the said low volume component gas from the liquid absorbent.

4. The process according to claim 1 wherein prior to recycling the liquid absorbent to the absorption vessel, it is withdrawn from the desorption zone and recycled back thereinto for enhancing removal and final concentration of said low volume component gas from the liquid absorbent.

5. The process according to claim 1 wherein the low volume component gas liberated from said absorbent in the desorption zone is conducted to a separator operated under predetermined conditions for removing water vapor therefrom, separating the water vapor in liquid state from said low volume component gas and conducting the water to the desorption zone so as to control the desorption characteristics of the absorbent suspended therein.

6. The process according to claim 2 wherein the low volume component gas liberated from said absorbent in the desorption zone is conducted to a separator operated under predetermined conditions for removing water vapor therefrom, separating the water vapor in liquid state from said low volume component gas and conducting the water to the desorption zone so as to control the desorption characteristics of the absorbent suspended therein.

7. The process according to claim 3 wherein the low volume component gas liberated from said absorbent in the desorption zone is conducted to a separator operated under predetermined conditions for removing water vapor therefrom, separating the water vapor in liquid state from said low volume component gas and conducting the water to the desorption zone so as to control the desorption characteristics of the absorbent suspended therein.

8. A process for the separation of hydrogen sulphide from an industrial gas stream having a hydrogen sulphide component as low as approximately 1 percent which comprises the steps of concentrating the hydrogen sulphide by contacting the stream with a liquid, water soluble absorbing agent under controlled conditions in a first contact zone to thereby absorb hydrogen sulphide, and removing the hydrogen sulphide loaded absorbing agent to a liberation zone while a residue gas stream containing trace hydrogen sulphide is removed for subsequent processing to second contact zone, liberating the hydrogen sulphide from the absorbing agent at rates of concentration in accordance with or dependent on predetermined operating absorbent and gas stream flow ratios, conveying the liberated absorbing agent to the second contact zone for contacting said residue gas stream, conducting the residue gas stream and liberated absorbing agent into a separator for removing the absorbent from the stream, and conducting said absorbent back to said first contact zone for contacting said industrial gas stream.

* * * * *

UNITED STATES PATENT OFFICE
CERTIFICATE OF CORRECTION

Patent No. 3,656,275　　　　　　　Dated April 18, 1972

Inventor(s) Wesley L. Hunter

It is certified that error appears in the above-identified patent and that said Letters Patent are hereby corrected as shown below:

Column 4, line 5　　After "and" and before "then" insert -- are -- .

Claim 1, Line 67　　Delete "wheel" and substitute therefor "vessel".

Signed and sealed this 27th day of November 1963.

(SEAL)
Attest:

EDWARD M. FLETCHER, JR.　　　　RENE D. TEGTMEYER
Attesting Officer　　　　　　　　Acting Commissioner of Patents